United States Patent
Tabata et al.

(10) Patent No.: US 9,065,379 B2
(45) Date of Patent: Jun. 23, 2015

(54) CONTROL DEVICE FOR VEHICLE GENERATOR-MOTOR AND CONTROL METHOD THEREFOR

(71) Applicant: Mitsubishi Electric Corporation, Chiyoda-ku, Tokyo (JP)

(72) Inventors: Mitsunori Tabata, Chiyoda-ku (JP); Masato Mori, Chiyoda-ku (JP); Kenichi Akita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 79 days.

(21) Appl. No.: 14/054,432

(22) Filed: Oct. 15, 2013

(65) Prior Publication Data

US 2014/0292240 A1 Oct. 2, 2014

(30) Foreign Application Priority Data

Apr. 1, 2013 (JP) ................. 2013-075762

(51) Int. Cl.
*H02P 7/00* (2006.01)
*H02P 23/14* (2006.01)

(52) U.S. Cl.
CPC ..................... *H02P 23/14* (2013.01)

(58) Field of Classification Search
CPC .............. B62D 5/0463; H02P 6/142
USPC ............ 318/400.01, 400.02, 400.14, 400.15, 318/400.26, 400.27, 430, 432, 437, 599, 318/801, 811, 701, 727, 799; 388/800, 811, 388/819; 322/23, 24, 59, 99
See application file for complete search history.

(56) References Cited

U.S. PATENT DOCUMENTS

| | | | |
|---|---|---|---|
| 7,495,411 B2* | 2/2009 | Kaneko et al. | 318/801 |
| 7,592,785 B2* | 9/2009 | Kimura et al. | 322/59 |
| 2007/0029121 A1 | 2/2007 | Saitou et al. | |

FOREIGN PATENT DOCUMENTS

| | | |
|---|---|---|
| JP | 2000-050689 A | 2/2000 |
| JP | 2007-300750 A | 11/2007 |
| JP | 4493639 B2 | 5/2008 |
| JP | 2009-201250 A | 9/2009 |
| JP | 2010-148331 A | 7/2010 |
| WO | 2005-068245 A1 | 7/2005 |

OTHER PUBLICATIONS

Japanese Office Action (Preliminary Notice of Reasons for Rejection) dated May 13, 2014, Patent Application No. 2013-075762.

* cited by examiner

*Primary Examiner* — Antony M Paul
(74) *Attorney, Agent, or Firm* — Sughrue Mion, PLLC; Richard C. Turner

(57) ABSTRACT

Provided are a low-cost control device and the like for a vehicle generator-motor for minimizing the number of current sensors and the like, and estimating an output torque and a current consumption during drive of the generator-motor. The output torque and the current consumption during the drive of the generator-motor are estimated based on a field current, an rpm, a DC voltage, and a phase of an AC voltage to be supplied of the generator-motor, without providing a current sensor for detecting an input current from a power supply to an inverter device of the generator-motor, and a current sensor for detecting an output current from the inverter device to an armature winding of a rotary electric machine.

16 Claims, 11 Drawing Sheets

CONTROL DEVICE FOR VEHICLE GENERATOR-MOTOR AND CONTROL METHOD THEREFOR

BACKGROUND OF THE INVENTION

1. Field of the Invention

The present invention relates to a control device for a vehicle generator-motor and a control method therefor. The vehicle generator-motor is installed mainly on a vehicle to operate as a motor when starting up an engine and during a torque assistance, and to operate as a generator after the engine is started up.

2. Description of the Related Art

In recent years, in order to increase the fuel efficiency, and to comply with the environmental standard, there have been developed a vehicle that is equipped with a generator-motor, and carries out the so-called idle stop operation, in which an engine is stopped when the vehicle is stationary, and the generator-motor is driven to restart up the engine or carry out a torque assistance when the vehicle starts to move.

The generator-motor used on this type of vehicle needs to be small in size, low in cost, and high in torque, and hence often employs a field winding type of synchronous generator-motor, and carries out drive through rectangular wave power supply (for example, Japanese Patent No. 4493639).

Moreover, when the engine torque assistance is carried out by using the generator-motor, an engine control unit needs to recognize a torque currently output by the generator-motor, and then to carry out cooperative control. As means for recognizing the torque, a method of using an AC power and a conversion efficiency to estimate the torque is proposed (for example, Japanese Patent Application Laid-open No. 2000-50689).

Moreover, a method of detecting a current consumption of the generator-motor, and estimating, based on an average current thereof, a state of charge (SOC) of a battery, and a cruising range is proposed (for example, International Patent WO2005/068245).

However, as described above, the generator-motor used in this application is strongly required to be low in cost. Thus, a current sensor for detecting an input current from a power supply into an inverter device of the generator-motor and a current sensor for detecting an output current from the inverter device to an armature winding of a rotary electric machine are often not provided.

Therefore, the current consumption during the drive cannot be acquired, and the conventionally proposed methods cannot be used for the torque estimation, the battery SOC estimation, and the like.

SUMMARY OF THE INVENTION

The present invention has been made in view of the above-mentioned problem, and therefore has an object to provide a low-cost control device and the like for a vehicle generator-motor for minimizing the number of current sensors and the like, and estimating an output torque and a current consumption during the drive of the generator-motor.

According to one embodiment of the present invention, there are provided a control device for a vehicle generator-motor and a control method therefor. The control device includes: a power conversion unit connected between a rotary electric machine and a DC power supply, the rotary electric machine being connected to an internal combustion engine via a power transmission unit, for mutually converting between AC power and DC power; and a control unit for controlling the power conversion unit. In the control device, the control unit includes: a field current control unit for controlling a current to be supplied to a field winding of the generator-motor; an AC voltage phase control unit for controlling an AC voltage phase of an AC voltage to be output by the power conversion unit to an armature winding; a field current detecting unit for detecting a field current flowing through the field winding of the generator-motor; an rpm detecting unit for detecting an rpm of the generator-motor; a DC voltage detecting unit for detecting an input DC voltage from the DC power supply to the power conversion unit; and a generator-motor state estimation unit for acquiring, when the generator-motor operates as a motor, based on the field current, the rpm, the input DC voltage, and the AC voltage phase, at least one of an estimated output torque value and an estimated current consumption value of the generator-motor.

According to the one embodiment of the present invention, it is possible to provide the low-cost control device and the like for the vehicle generator-motor for minimizing the number of the current sensors and the like, and estimating the output torque and the current consumption during the drive of the generator-motor.

DETAILED DESCRIPTION OF THE PREFERRED EMBODIMENTS

Figure 1:
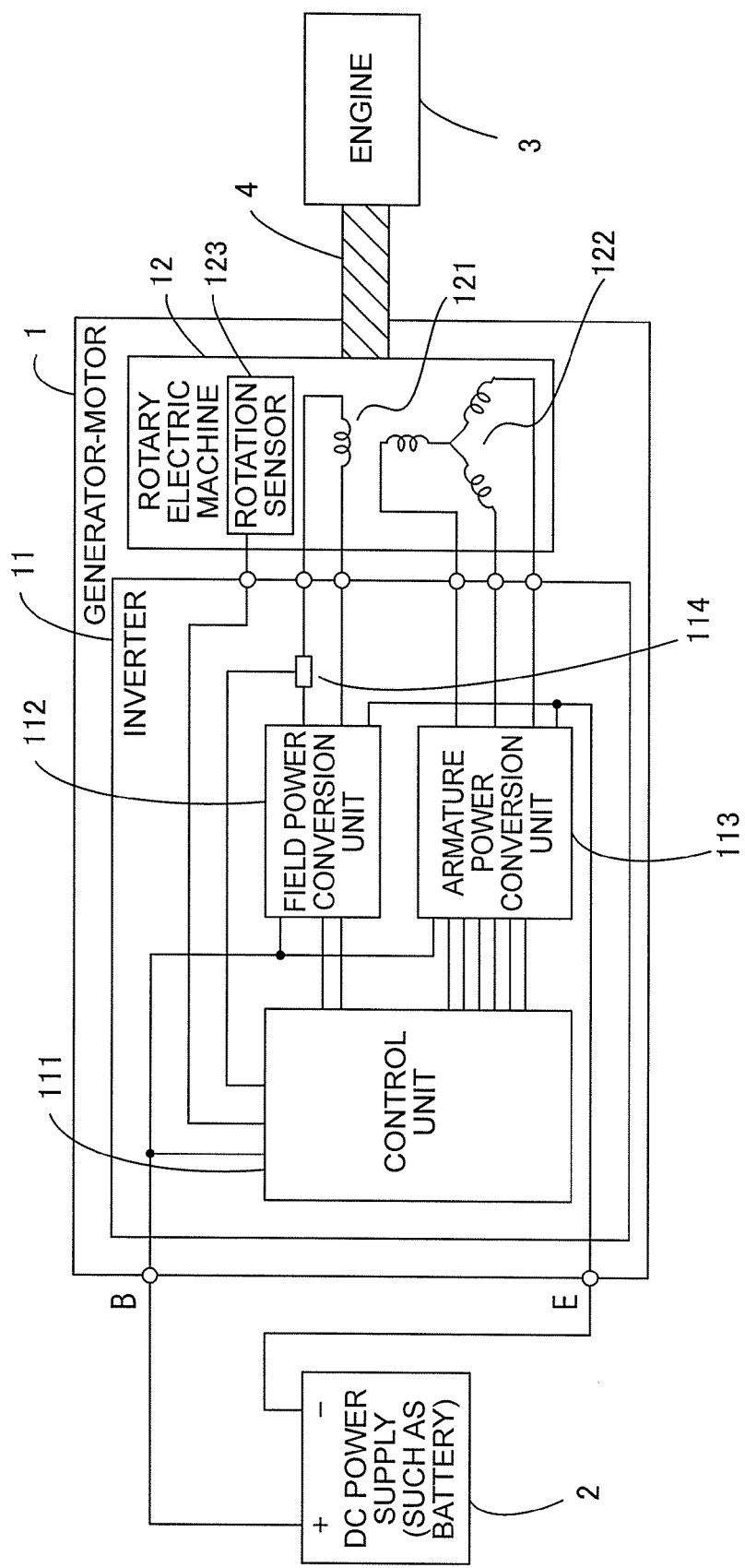
FIG. 1 is a diagram illustrating an example of a configuration of a vehicle system including a control device for a vehicle generator-motor according to a first embodiment of the present invention.

The present invention provides a control device and the like for a vehicle generator-motor for estimating, without providing a current sensor for detecting an input current from a power supply to an inverter device of the generator-motor and a current sensor for detecting an output current from the inverter device to an armature winding of a rotary electric machine, an output torque and a current consumption during drive of the generator-motor based on a field current, an rpm, a DC voltage, and a phase of an AC voltage to be supplied of the generator-motor.

A description is now given of a control device and the like for a vehicle generator-motor according to exemplary embodiments of the present invention referring to the drawings. In the exemplary embodiments, the same or corresponding components are denoted by the same reference symbols, and descriptions thereof are omitted herein.

First Embodiment

FIG. 1 is a diagram illustrating an example of a configuration of a vehicle system including a control device for a vehicle generator-motor according to a first embodiment of the present invention. In FIG. 1, a generator-motor 1 includes an inverter 11 and a rotary electric machine 12.

The rotary electric machine 12 is coupled to an engine (internal combustion engine) 3 via a power transmission unit 4 such as a belt. The rotary electric machine 12 is supplied with electric power via terminals B and E from a DC power supply 2 such as a battery or a capacitor to operate as a motor, and rotates the engine 3 via the power transmission unit 4 to start up the engine 3.

On the other hand, during the operation of the engine 3, the rotary electric machine 12 receives torque of the engine 3 via the power transmission unit 4 to operate as a generator, and supplies the DC power supply 2 with the generated electric power via the terminals B and E to charge the DC power supply 2 to a predetermined voltage. Moreover, the rotary electric machine 12 may operate as a motor for carrying out a torque assistance for the engine 3 during the operation of the engine 3.

A controller of an external idle stop system, a key switch, or the like (not shown) instructs an operation mode, and the rotary electric machine 12 operates in the mode corresponding to the instruction, which is not illustrated in FIG. 1.

The rotary electric machine 12 is a synchronous machine of a field winding type, and includes an armature winding 122 provided on a stator and a field winding 121 provided on a rotor. Moreover, on the rotary electric machine 12, a rotation sensor 123 for detecting a rotation position and an rpm of the rotor is provided.

The inverter 11 includes a field power conversion unit 112 connected to the field winding 121 of the rotary electric machine 12, an armature power conversion unit 113 connected to the armature winding 122 of the rotary electric machine 12, a control unit 111 for generating on/off commands (hereinafter referred to as gate signals) for power conversion devices directed to the field power conversion unit 112 and the armature power conversion unit 113, and a current sensor 114 for detecting a field current. The inverter 11 constitutes the control device for the generator-motor 1 according to the first embodiment of the present invention.

The field power conversion unit 112 operates based on the gate signals from the control unit 111, and controls, by means of PWM control, the field current flowing through the field winding 121. The field power conversion unit 112 generally includes a half bridge circuit constructed of MOS FETs.

Figure 2:
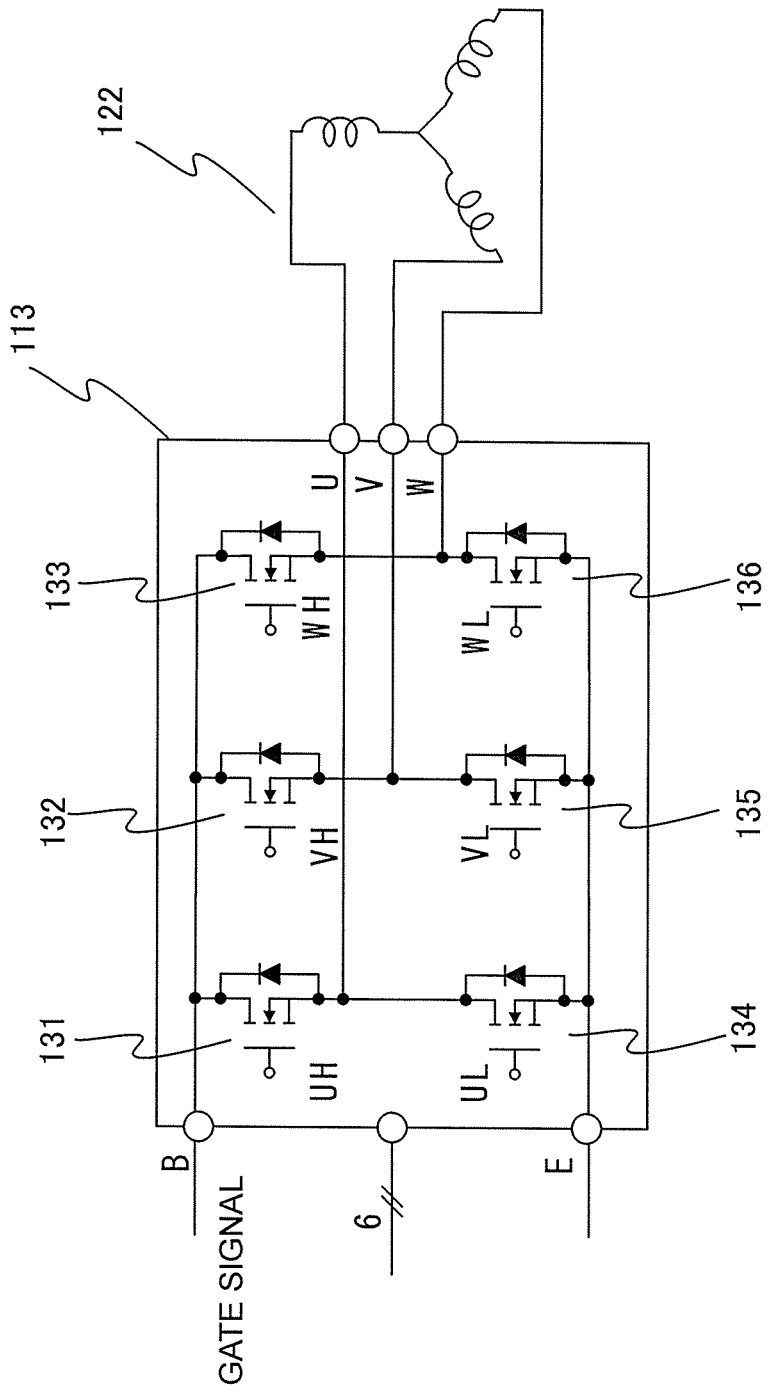
FIG. 2 is a diagram illustrating an example of a configuration of an armature power conversion unit in FIG. 1.

As the armature power conversion unit 113, a three-phase bridge circuit constructed of MOS FETs is generally used. FIG. 2 is a diagram illustrating an example of an internal configuration of the armature power conversion unit 113. The armature power conversion unit 113 includes MOS FETs UH, VH, and WH (power conversion devices 131 to 133) of a positive side arm (upper arm) and MOS FETs UL, VL, and WL (power conversion devices 134 to 136) of a negative side arm (lower arm) of the armature winding 122. The respective power conversion devices are controlled to turn on/off by gate signals UHG, VHG, WHG, ULG, VLG, and WLG from the control unit 111.

When the rotary electric machine 12 is driven as a motor, the armature power conversion unit 113 controls the MOS FETs (power conversion devices) 131 to 136 to turn on/off based on the gate signals from the control unit 111, thereby supplying the armature winding 122 with a three-phase AC current as an armature current. On this occasion, simultaneously, the field power conversion unit 112 supplies the field winding 121 with a field current. As a result, the rotary electric machine 12 operates as a three-phase synchronous motor to start up the engine 3 via the power transmission unit 4.

On the other hand, when the rotary electric machine 12 is operated as a generator, the armature power conversion unit 113 rectifies the armature current, which is a three-phase AC current, from the armature winding 122 into a DC current, and supplies the DC power supply 2 with the DC current to charge the DC power supply 2, thereby further supplying other loads (not shown) with DC currents.

The operation of the rotary electric machine 12 as the generator is, as is widely known, carried out by supplying, when the rotor is driven to rotate by the engine 3 via the power transmission unit 4, the field winding 121 of the rotor with the field current from the field power conversion unit 112 to induce the three-phase AC voltages on the armature winding 122.

In this embodiment, the generator-motor 1 includes the three-phase armature winding, but the generator-motor 1 may include a plurality of sets of the three-phase armature winding or an armature winding of four or more phases.

Figure 3:
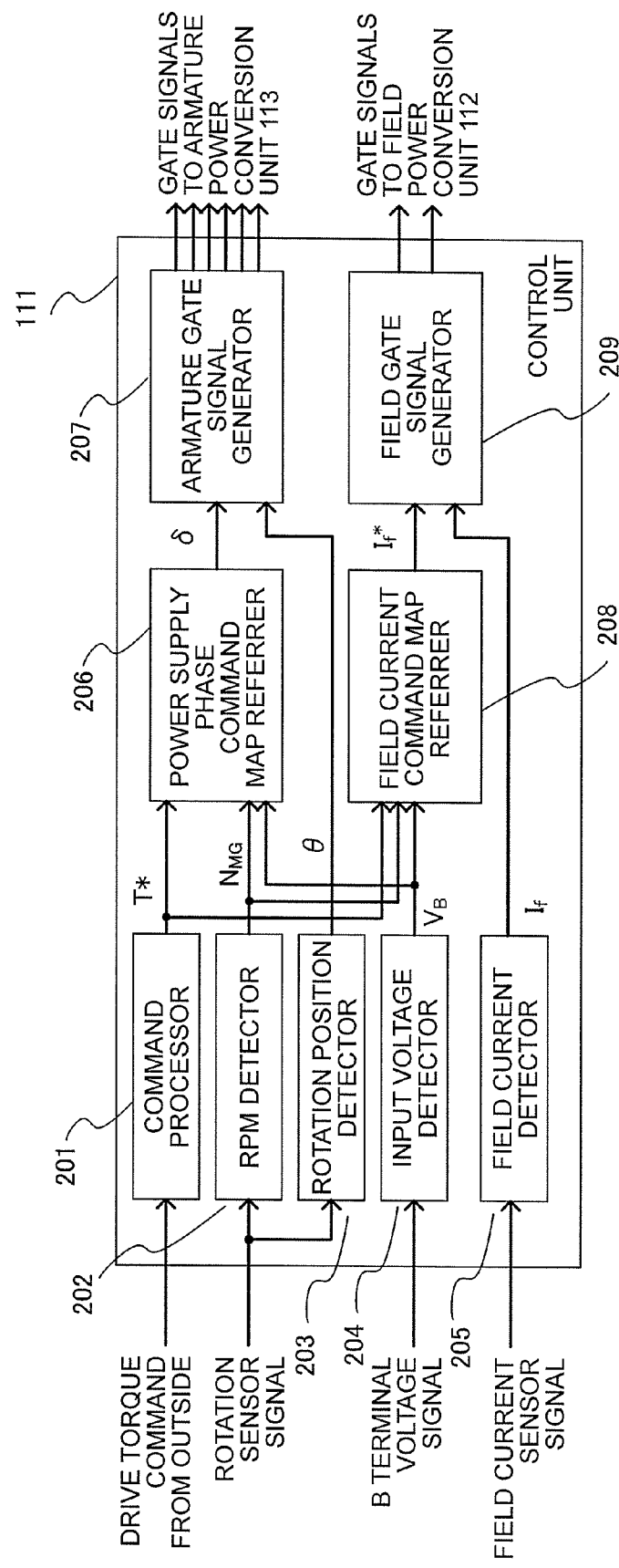
FIG. 3 is a functional block diagram of a portion relating to a generator-motor drive by a control unit in FIG. 1.

A description is now given of a control operation for the according to the first embodiment of the present invention having the configuration as described above. FIG. 3 is a functional block diagram of a portion relating to the generator-motor driven by the control unit 111 in FIG. 1. The control unit 111 includes, for example, a microcomputer including a memory. When a drive torque command is input to the generator-motor 1 from a host controller (not shown), the command is processed by a command processor 201 in the control unit 111, and the following operations are carried out to generate a drive torque.

Figure 4:
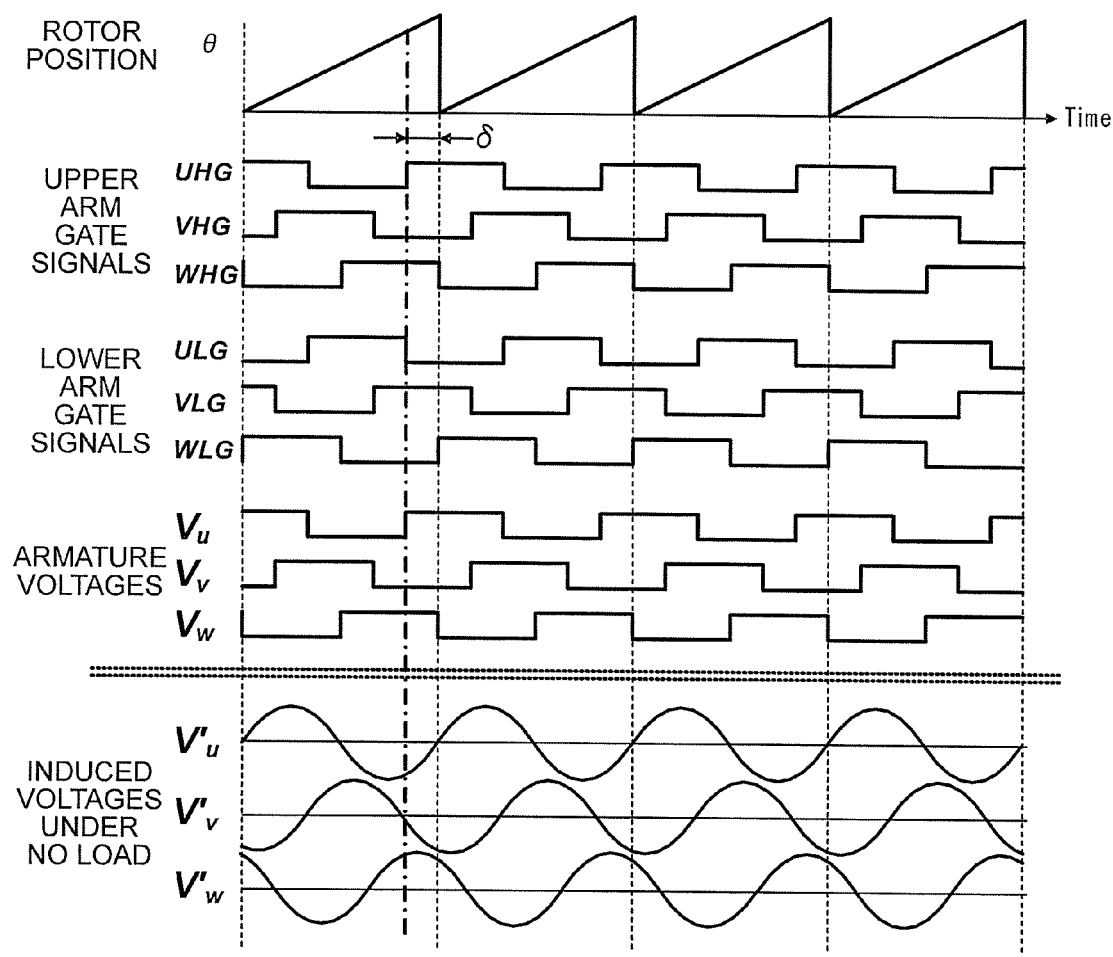
FIG. 4 is a time chart illustrating states of respective parts in power supply control for an armature winding during the drive according to the first embodiment of the present invention.

One operation is control of the power supply to the armature winding 122. FIG. 4 is a time chart illustrating states of respective parts in the power supply control directed to the armature winding 122 during the drive, and illustrates temporal changes of a rotor position of the rotary electric machine 12, the gate signals supplied to the respective power conversion devices 131 to 136, armature voltages which are voltages at terminals U, V, and W, and induced voltages under no load. When a power supply phase command map referrer 206 receives the drive command from the command processor 201, the power supply phase command map referrer 206 refers, based on a command value T* of the drive torque acquired by converting the drive torque command from the outside by the command processor 201, an rpm $N_{MG}$ detected by an rpm detector 202 based on the signal from the rotation sensor 123, and an input voltage $V_B$ detected by an input voltage detector 204 from the B terminal voltage signal, to a map for the power supply phase command stored in the map referrer 206 illustrated on an upper side in FIG. 5 to acquire a power supply phase command 6 for issuing the AC voltage phase command depending on the operation state.

Figure 5:
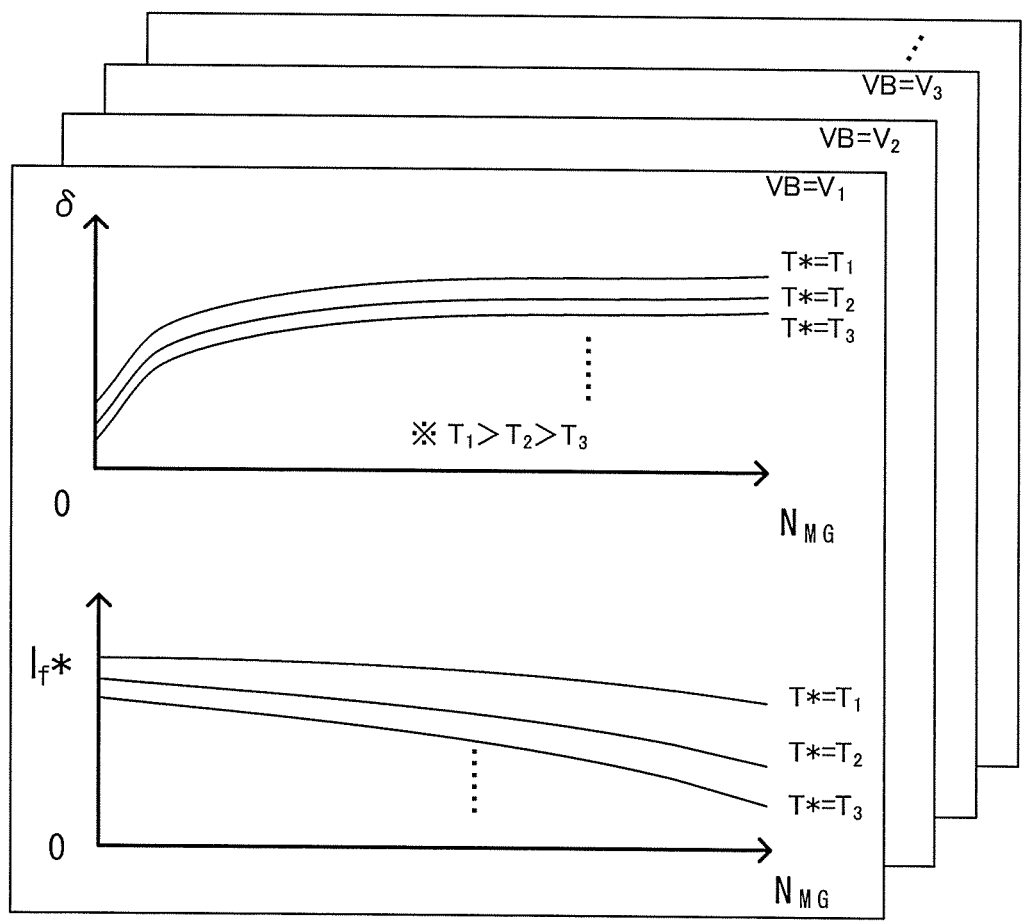
FIG. 5 is a diagram illustrating an example of a power supply phase command map and a field current command map according to the first embodiment of the present invention.

In FIG. 5, the upper side is an example of the power supply phase command map, and illustrates a relationship of the power supply phase command (representing the AC voltage phase) $\delta$ to the rpm $N_{MG}$, the drive torque command value T*, and the B terminal voltage $V_B$. The lower side is an example of the field current command map described later, and illustrates a relationship of a field current command $I_f^*$ to the rpm $N_{MG}$, the drive torque command value T*, and the B terminal voltage $V_B$. These maps are actually stored in the memory.

Then, an armature gate signal generator 207 generates, based on the power supply phase command $\delta$ and a position $\theta$ of the rotor detected by a rotation position detector 203 based on the signal from the rotation sensor 123, the gate signals to turn on/off the respective power conversion devices 131 to 136 of the three-phase bridge of the armature power conversion unit 113 to apply voltages in a rectangular waveform to the armature winding 122. On this occasion, as illustrated in FIG. 4, the armature voltages are applied so that the phases respectively lead, by $\delta$, the induced voltages changing depending on the rotor position during the no load. Usually, a range of applying the voltage is 180° or 120° in electric angle, and, in FIG. 4, is 180°.

The other operation is control of the current supplied to the field winding 121. When a field current command map referrer 208 receives the drive command from the command processor 201, the field current command map referrer 208 refers, based on the command value T* of the drive torque from the command processor 201, the rpm $N_{MG}$ detected by the rpm detector 202, and the input voltage $V_B$ detected by the input voltage detector 204, to the map of the field current command stored in the map referrer 208 and illustrated in the lower side in FIG. 5 to acquire the field current command $I_f^*$ corresponding to the operation state.

Then, a field gate signal generator 209 carries out, based on the above-mentioned field current command $I_f^*$ and a field current $I_f$ detected by a field current detector 205 from a signal of the current sensor 114 for the field current, the PI (proportional integral) control or the like so that the detection result of the field current matches the field current command, generates the gate signals to turn on/off the respective power conversion devices (not shown) of the half bridge of the field power conversion unit 112, and supplies the field winding 121 with a desired field current.

The maps are generated depending on characteristics of the rotary electric machine 12 in advance, and are stored in the memory. Moreover, the input current and the rpm successively change during the drive, and the detections of the respective input signals and the processing of referring to the maps (update of the control command values) are successively carried out.

In this way, by adjusting the timings of applying the voltages in the rectangular waveforms to the armature winding 122 and the magnitude of the field current, the drive toque is generated.

A description is now given of a method of estimating the output torque. The output torque T of the synchronous generator-motor is represented by Equation 1.

$$\tau = P_m \phi_f I_q + P_m (L_d - L_q) I_d I_q \quad \text{[Equation 1]}$$

where:
$P_m$: number of pairs of poles,
$\phi_f$: field magnetic flux,
$I_d$ and $I_q$: d axis current and q axis current, respectively, and
$L_d$ and $L_q$: d axis inductance and q axis inductance, respectively.

The currents $I_d$ and $I_q$ of the synchronous generator-motor are represented by Equation 2. Moreover, Z is an absolute value of a synchronous impedance of the synchronous generator-motor represented by Equation 3.

$$I_d = (1/Z^2)\{R_a V \cos \delta + \psi L_q (V \sin \delta - \psi \phi_f)\}$$

$$I_q = (1/Z^2)\{R_a(V \sin \Omega - \psi \phi_f) - \psi L_d V \cos \delta\} \quad \text{[Equation 2]}$$

$$Z = \sqrt{(R_a^2 + \psi^2 L_d L_q)} \quad \text{[Equation 3]}$$

where:
$R_a$: armature resistance of the synchronous generator-motor,
V: voltage amplitude which can be applied by the armature power conversion unit,
$\psi$: rotation angular velocity, and
$\delta$: phase advance quantity (namely power supply phase) of the armature voltage phase with respect to the rotor phase.

In a range without magnetic saturation, the field magnetic flux $\phi_f$ is approximately proportional to the field current $I_f$ ($\phi_f = k \cdot I_f$). Moreover, a voltage amplitude which the armature power conversion unit 113 can apply is $V_B \times 0.780$ ($V_B$ is the B terminal voltage) in the 180° rectangular waveform power supply method.

Thus, from Equations 1 and 2, it is appreciated that the torque $\tau$ of the synchronous generator-motor can be acquired from the B terminal voltage $V_B$, the field current $I_f$, the rpm $N_{MG}$, the power supply phase $\delta$ of the AC voltage applied to the armature, and the armature resistance $R_a$.

Figure 6:
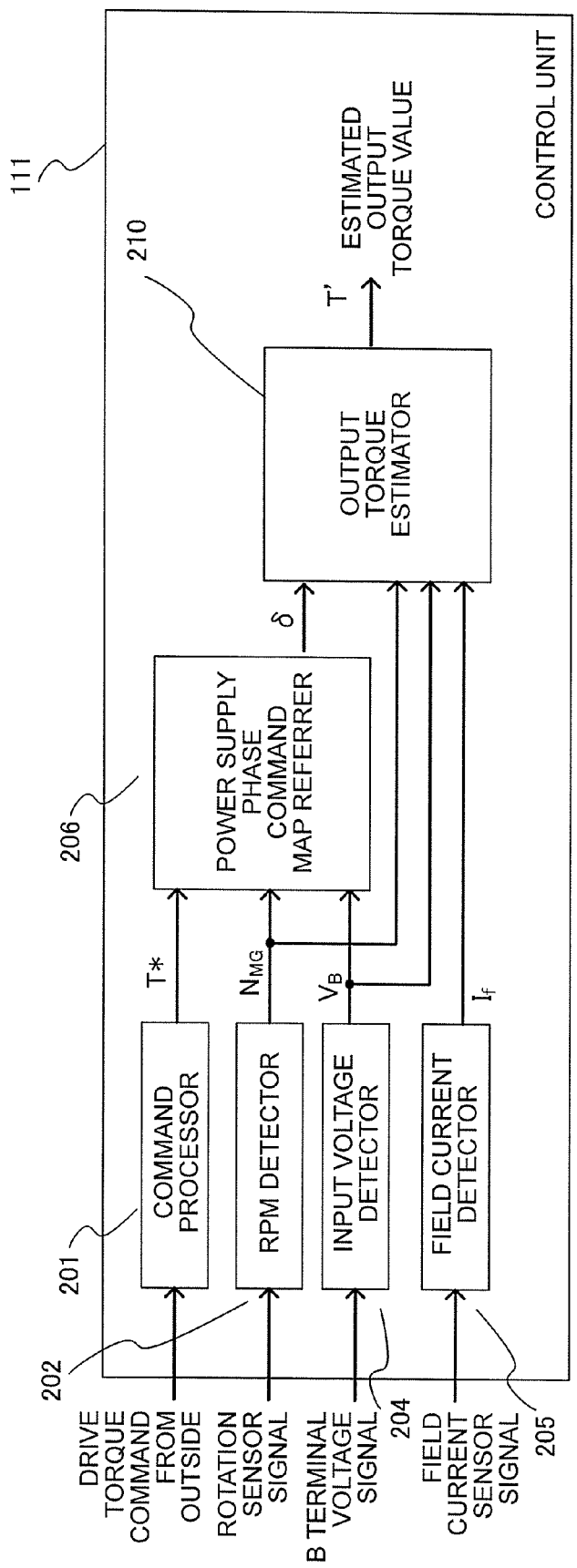
FIG. 6 is a functional block diagram of a portion relating to output torque estimation by the control unit in FIG. 1 according to the first embodiment of the present invention.

A description is now given of a specific estimation method according to the first embodiment of the present invention. FIG. 6 is a functional block diagram of a portion relating to the output torque estimation by the control unit 111 in FIG. 1. The estimation of the output torque is carried out by an output torque estimator 210 in the control unit 111.

Figure 7:
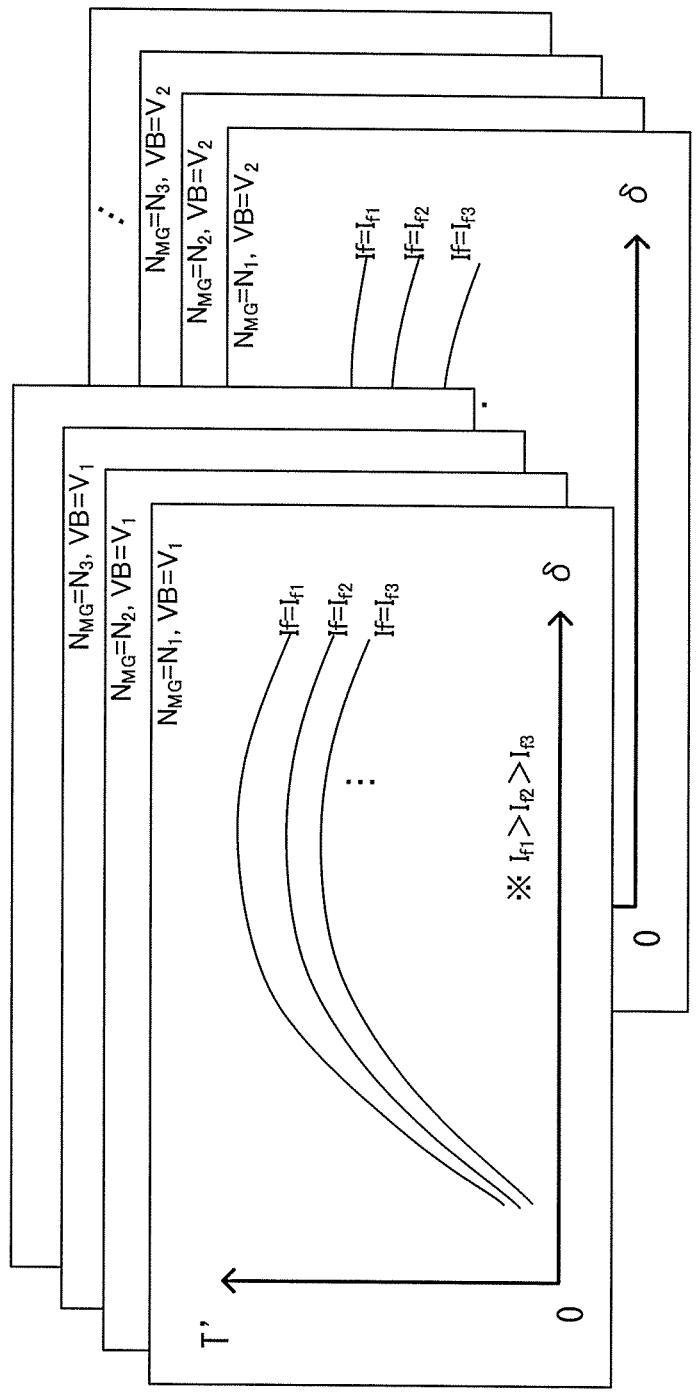
FIG. 7 is a diagram illustrating an example of an output torque estimation map according to the first embodiment of the present invention.

During the drive by the generator-motor 1, the output torque estimator 210 refers, based on the power supply phase command 6 from the power supply phase command map referrer 206, the rpm $N_{MG}$ detected by the rpm detector 202, the input voltage $V_B$ detected by the input voltage detector 204, and the field current $I_f$ detected by the field current detector 205, to an output torque estimation map illustrated in FIG. 7 stored in the output torque estimator 210 to acquire an estimated output torque value T' corresponding to the operation state.

FIG. 7 is an example of the output torque estimation map, and illustrates a relationship of the estimated output torque value T' to the power supply phase command $\delta$, the field current $I_f$, the rpm $N_{MG}$, and the B terminal voltage $V_B$. The map is actually stored in the memory.

In the output torque estimation processing, the map for calculating the output torque from these elements is prepared in advance and referred to, but alternatively, the output torque estimation processing may not have the map, and may calculate the output torque each time by using Equations 1 to 3.

Moreover, the armature resistance $R_a$ changes depending on the temperature of the armature winding 122, and, according to this embodiment, it is considered that the temperature is approximately constant when a vehicle is operated, and is thus treated as a constant temperature. The generator-motor including a detecting unit (not shown) such as a temperature sensor for detecting the temperature of the armature winding 122 can also use the temperature information on the armature winding 122 for the estimation to further increase an estimation accuracy.

As the parameters used for the output torque calculation processing, the values detected by the respective input signal detectors (202 to 205) are used. On the other hand, as the phase δ of the AC voltage applied to the armature winding 122, the power supply phase command value is used for the estimation. This is because there are substantially no factors causing the actual value to deviate from the command value, and the power supply can be carried out at a power supply phase substantially the same as the command value.

Regarding the field current $I_f$ similarly having the command value (field current command $I_f^*$), a time constant of the field winding 121 is usually large, and the field current does not immediately follow the command value $I_f^*$ from the field current command map referrer 208. Thus, in order to estimate an accurate torque in a transient region, it is desired that the command value be not used but the directly detected value be used.

Figure 8:
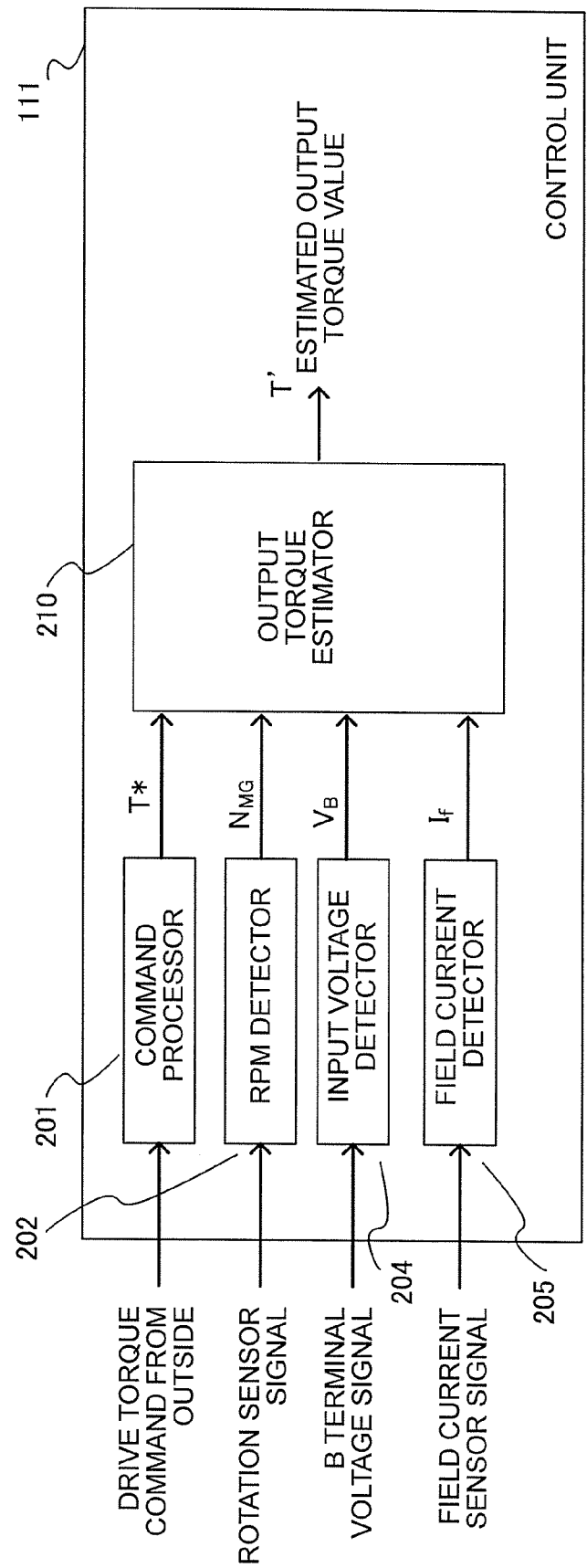
FIG. 8 is a functional block diagram of a portion relating to the output torque estimation by the control unit in FIG. 1 according to a variation of the first embodiment of the present invention.

Moreover, in this embodiment, the result δ of referring to the power supply phase command map (upper side in FIG. 5) is used to estimate the torque. However, if the power supply phase command δ output by the power supply phase command map referrer 206 is uniquely determined for a certain rpm, a certain B terminal voltage, and a certain torque command, as illustrated in FIG. 8, the drive torque command T* may be input directly into the output torque estimator 210.

In this case, the output torque estimation map in FIG. 7 becomes a map illustrating a relationship of the estimated output torque value T' to the drive torque command T*, the field current $I_f$, the rpm $N_{MG}$, and the B terminal voltage $V_B$.

As described above, according to the first embodiment of the present invention, without providing an input current sensor for the inverter 11 and an output current sensor for the armature winding of the rotary electric machine, the output torque of the generator-motor 1 can be estimated, and the estimated output torque can be transmitted via a vehicle network such as a CAN or LIN to a controller of an idle stop system or a controller of an engine control system on the outside.

Second Embodiment

While the estimation processing for the output torque is carried out according to the first embodiment, a second embodiment of the present invention estimates, in place of the output torque estimation processing, an input current to the inverter 11, namely, a current consumption $I_B$ of the generator-motor 1.

The current consumption $I_B$ of the generator-motor is determined as in the processing of estimating the output torque by a relationship between the armature current and the field magnetic flux, and the current consumption $I_B$ can thus be represented as a function of the d axis current $I_d$ and the q axis current $I_q$ of the generator-motor. Thus, the current consumption $I_B$ can be acquired, as in the output torque, from the B terminal voltage $V_B$, the field current $I_f$, the rpm $N_{MG}$, the phase (power supply phase command) δ of the AC voltage applied to the armature, and the armature resistance $R_a$.

Figure 9:
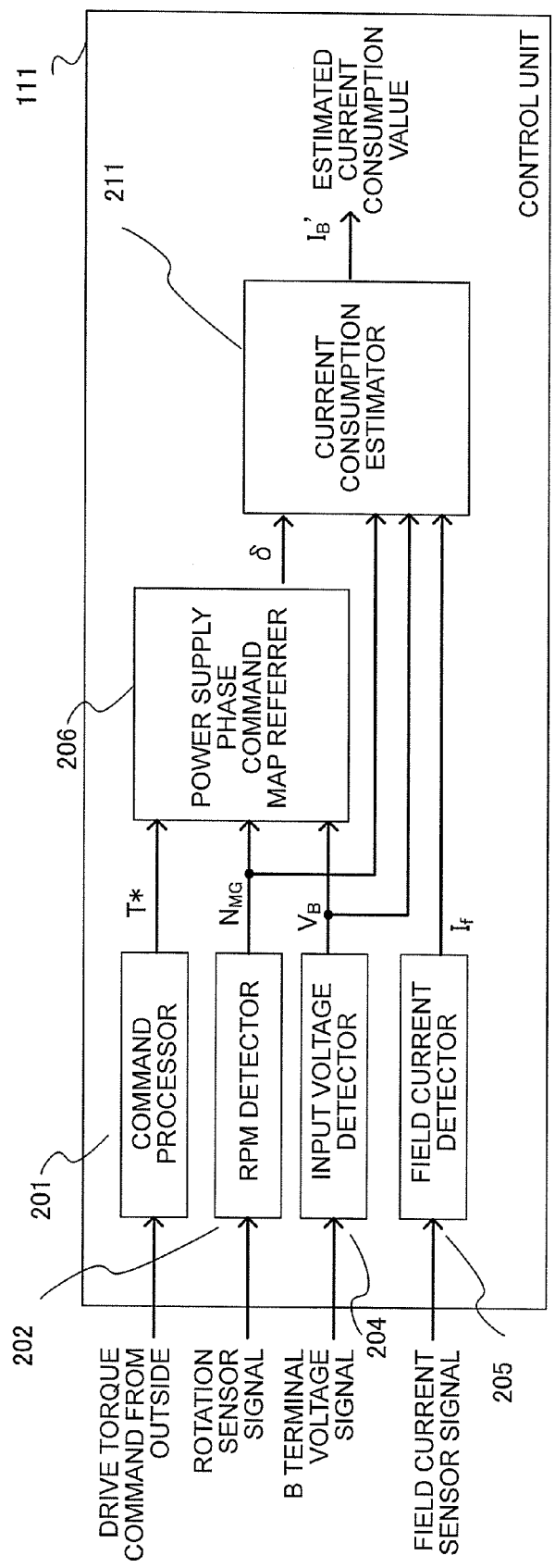
FIG. 9 is a functional block diagram of a portion relating to current consumption estimation by the control unit in FIG. 1 according to a second embodiment of the present invention.

A description is now given of a specific method of the estimation. As illustrated in FIG. 9, the estimation of the current consumption is carried out by a current consumption estimator 211 in the control unit 111. During the drive by the generator-motor, the current consumption estimator 211 refers, based on the power supply phase command δ from the power supply phase command map referrer 206, the rpm $N_{MG}$ detected by the rpm detector 202, the input voltage $V_B$ detected by the input voltage detector 204, and the field current $I_f$ detected by the field current detector 205, to a current consumption estimation map illustrated in FIG. 10 stored in the current consumption estimator 211 to estimate an estimated current consumption value $I_B'$ corresponding to the operation state.

Figure 10:
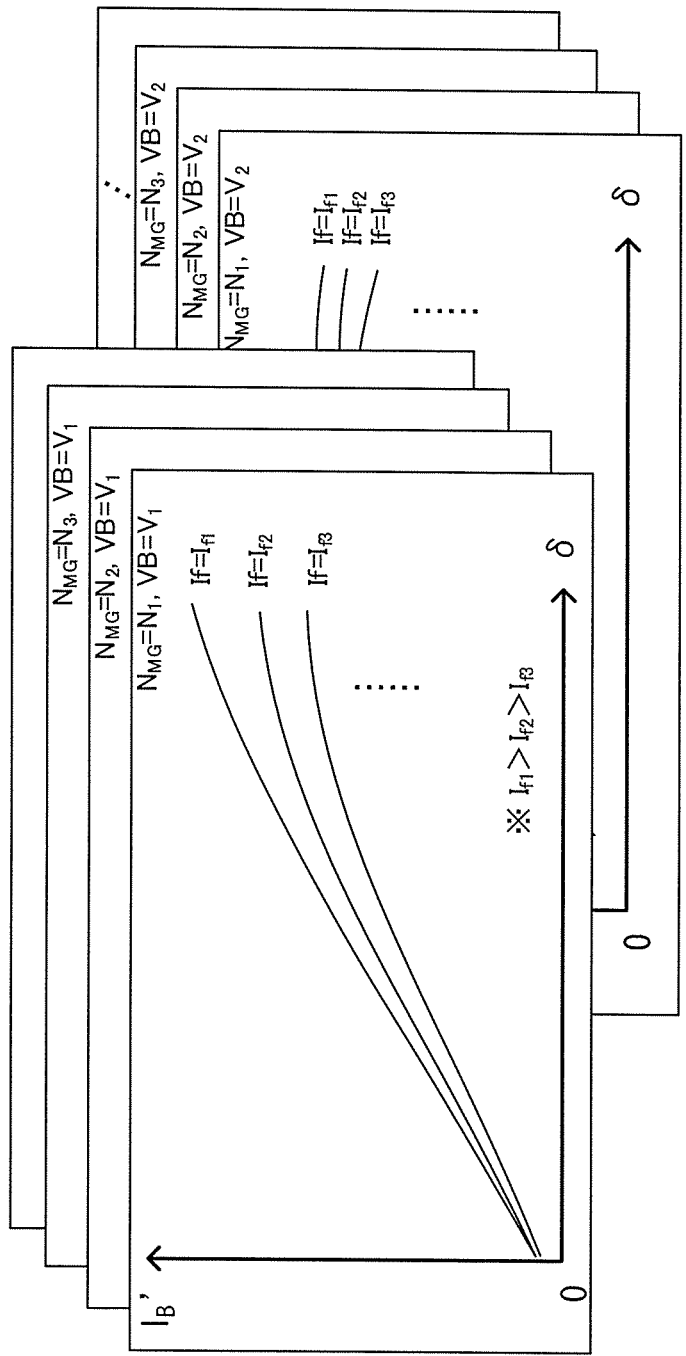
FIG. 10 is a diagram illustrating an example of a current consumption estimation map according to the second embodiment of the present invention.

FIG. 10 is an example of the current consumption estimation map, and illustrates a relationship of the estimated current consumption value $I_B'$ to the power supply phase command δ, the field current $I_f$, the rpm $N_{MG}$, and the B terminal voltage $V_B$. The map is actually stored in the memory.

In the current consumption estimation processing, according to this embodiment, a map used for calculating the current consumption from these elements is prepared in advance and referred to. Moreover, the armature resistance $R_a$ changes depending on the temperature of the armature winding 122, and, according to this embodiment, as in the above-mentioned embodiment, it is considered that the temperature is approximately constant when a vehicle is operated, and is thus treated to be constant. The generator-motor including a detecting unit (not shown) such as a temperature sensor for detecting the temperature of the armature winding 122 can also use the temperature information on the armature winding 122 for the estimation to further increase an estimation accuracy.

As the parameters used for the current consumption calculation processing, the values detected by the respective input signal detectors (202 to 205) are used. On the other hand, as the phase δ of the AC voltage applied to the armature winding 122, the power supply phase command value δ from the power supply phase command map referrer 206 is used for the estimation. This is because there are substantially no factors causing the actual value to deviate from the command value, and the power supply can be carried out at a power supply phase substantially the same as the command value.

Regarding the field current $I_f$ similarly having the command value (field current command $I_f^*$), the time constant of the field winding 121 is usually large, and the field current does not immediately follow the command value $I_f^*$ from the field current command map referrer 208. Thus, in order to estimate an accurate current consumption in a transient region, it is desired that the command value be not used but the directly detected value be used.

Moreover, in this embodiment, the result δ of referring to the power supply phase command map (upper side in FIG. 5) is used to estimate the current consumption. However, if the power supply phase command δ output by the power supply phase command map referrer 206 is uniquely determined for a certain rpm, a certain B terminal voltage, and a certain torque command, as illustrated in FIG. 10, the torque command T* may be directly input into the current consumption estimator 211.

Figure 11:
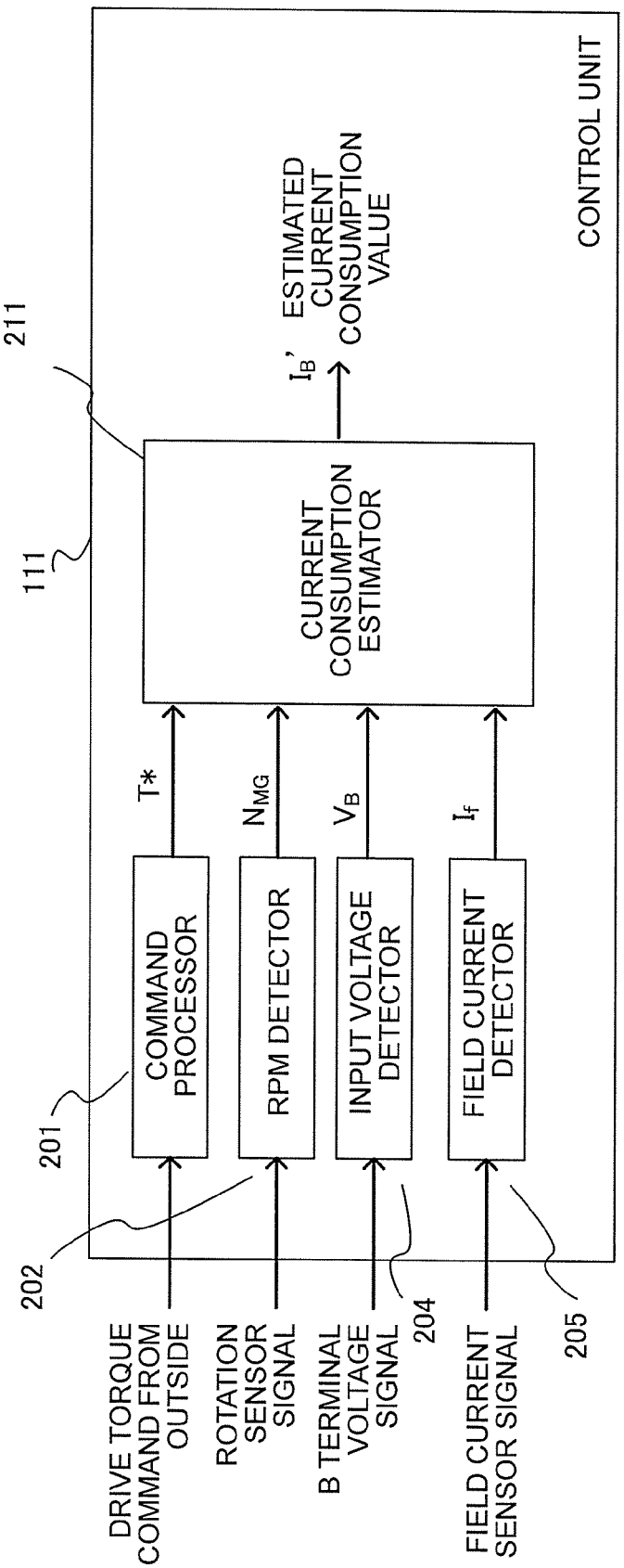
FIG. 11 is a functional block diagram of a portion relating to the current consumption estimation by the control unit in FIG. 1 according to a variation of the second embodiment of the present invention.

In this case, the output torque estimation map in FIG. 11 becomes a map illustrating a relationship of the estimated current consumption value $I_B'$ to the drive torque command T*, the field current $I_f$, the rpm $N_{MG}$, and the B terminal voltage $V_B$.

The present invention is not limited to the above-mentioned embodiments, and it should be understood that the present invention encompasses all possible combinations thereof.

For example, a combination of the functions of the output torque estimator 210 in FIG. 6 according to the first embodiment and the current consumption estimator 211 in FIG. 9 according to the second embodiment may be used as a generator-motor state estimator (corresponding to the estimators 210 and 211) to acquire at least one of the estimated output torque value and the estimated current consumption value of the generator-motor. In this case, the generator-motor state estimator uses the output torque estimation map in FIG. 7 and the current consumption estimation map in FIG. 11 stored in the memory to estimate the generator-motor states, namely the output torque and the current consumption.

Note that, the field power conversion unit 112 and the armature power conversion unit 113 constitute a power conversion unit, the field current command map referrer 208 and the field gate signal generator 209 constitute a field current control unit, the command processor 201, the power supply phase command map referrer 206, and the armature gate signal generator 207 constitute an AC voltage phase control unit, the current sensor 114 for the field current and the field current detector 205 constitute a field current detecting unit, the rotation sensor 123 and the rpm detector 202 for respectively detecting the rotation position and the rpm of the rotor constitute an rpm detecting unit, the input voltage detector 204 constitutes a DC voltage detecting unit, and the output torque estimator 210 and the current consumption estimator 211 constitute a generator-motor state estimation unit. Moreover, the torque command value T* and the power supply phase command 6 constitute an AC voltage phase.

What is claimed is:

1. A control device for a vehicle generator-motor, the control device comprising:
   a power conversion unit connected between a rotary electric machine and a DC power supply, the rotary electric machine being connected to an internal combustion engine via a power transmission unit, for mutually converting between AC power and DC power; and
   a control unit for controlling the power conversion unit, wherein the control unit comprises:
      a field current control unit for controlling a current to be supplied to a field winding of the generator-motor;
      an AC voltage phase control unit for controlling an AC voltage phase of an AC voltage to be output by the power conversion unit to an armature winding;
      a field current detecting unit for detecting a field current flowing through the field winding of the generator-motor;
      an rpm detecting unit for detecting an rpm of the generator-motor;
      a DC voltage detecting unit for detecting an input DC voltage from the DC power supply to the power conversion unit; and
      a generator-motor state estimation unit for acquiring, when the generator-motor operates as a motor, based on the field current, the rpm, the input DC voltage, and the AC voltage phase, at least one of an estimated output torque value and an estimated current consumption value of the generator-motor.

2. The control device for a vehicle generator-motor according to claim 1, wherein the generator-motor state estimation unit uses, as the AC voltage phase, a drive torque command value input from an outside.

3. The control device for a vehicle generator-motor according to claim 1, wherein:
   the AC voltage phase control unit acquires a power supply phase command based on a drive torque command value input from an outside, the rpm, and the input DC voltage; and
   the generator-motor state estimation unit uses the power supply phase command as the AC voltage phase.

4. The control device for a vehicle generator-motor according to claim 1, wherein the generator-motor state estimation unit comprises an output torque estimator for calculating the estimated output torque value of the generator-motor.

5. The control device for a vehicle generator-motor according to claim 2, wherein the generator-motor state estimation unit comprises an output torque estimator for calculating the estimated output torque value of the generator-motor.

6. The control device for a vehicle generator-motor according to claim 3, wherein the generator-motor state estimation unit comprises an output torque estimator for calculating the estimated output torque value of the generator-motor.

7. The control device for a vehicle generator-motor according to claim 1, wherein the generator-motor state estimation unit comprises a current consumption estimator for calculating the estimated current consumption value of the generator-motor.

8. The control device for a vehicle generator-motor according to claim 2, wherein the generator-motor state estimation unit comprises a current consumption estimator for calculating the estimated current consumption value of the generator-motor.

9. The control device for a vehicle generator-motor according to claim 3, wherein the generator-motor state estimation unit comprises a current consumption estimator for calculating the estimated current consumption value of the generator-motor.

10. The control device for a vehicle generator-motor according to claim 4, wherein the output torque estimator calculates the estimated output torque value by referring to an output torque estimation map stored in advance, the output torque estimation map indicating a relationship of the estimated output torque value to the field current, the rpm, the input DC voltage, and the AC voltage phase.

11. The control device for a vehicle generator-motor according to claim 5, wherein the output torque estimator calculates the estimated output torque value by referring to an output torque estimation map stored in advance, the output torque estimation map indicating a relationship of the estimated output torque value to the field current, the rpm, the input DC voltage, and the AC voltage phase.

12. The control device for a vehicle generator-motor according to claim 6, wherein the output torque estimator calculates the estimated output torque value by referring to an output torque estimation map stored in advance, the output torque estimation map indicating a relationship of the estimated output torque value to the field current, the rpm, the input DC voltage, and the AC voltage phase.

13. The control device for a vehicle generator-motor according to claim 7, wherein the current consumption estimator calculates the estimated current consumption value by referring to a current consumption estimation map stored in advance, the current consumption estimation map indicating a relationship of the estimated current consumption value to the field current, the rpm, the input DC voltage, and the AC voltage phase.

14. The control device for a vehicle generator-motor according to claim 8, wherein the current consumption estimator calculates the estimated current consumption value by referring to a current consumption estimation map stored in advance, the current consumption estimation map indicating a relationship of the estimated current consumption value to the field current, the rpm, the input DC voltage, and the AC voltage phase.

15. The control device for a vehicle generator-motor according to claim 9, wherein the current consumption estimator calculates the estimated current consumption value by referring to a current consumption estimation map stored in advance, the current consumption estimation map indicating a relationship of the estimated current consumption value to the field current, the rpm, the input DC voltage, and the AC voltage phase.

16. A control method for a vehicle generator-motor,
the vehicle generator-motor comprising a control device comprising:
- a power conversion unit connected between a rotary electric machine and a DC power supply, the rotary electric machine being connected to an internal combustion engine via a power transmission unit, for mutually converting between AC power and DC power; and
- a control unit for controlling the power conversion unit, the control method comprising acquiring, when the generator-motor operates as a motor, at least one of an estimated output torque value and an estimated current consumption value of the generator-motor based on:

an AC voltage phase acquired from an AC voltage phase control unit for controlling the AC voltage phase of an AC voltage to be output by the power conversion unit to an armature winding;

a field current acquired from a field current detecting unit for detecting the field current flowing through a field winding of the generator-motor;

an rpm acquired from an rpm detecting unit for detecting the rpm of the generator-motor; and an input DC voltage acquired from a DC voltage detecting unit for detecting the input DC voltage from the DC power supply to the power conversion unit.

* * * * *